United States Patent
Kudo et al.

(10) Patent No.: US 10,626,509 B2
(45) Date of Patent: *Apr. 21, 2020

(54) ELECTROLYSIS CELL AND ELECTROLYTIC DEVICE FOR CARBON DIOXIDE

(71) Applicant: KABUSHIKI KAISHA TOSHIBA, Minato-ku (JP)

(72) Inventors: Yuki Kudo, Yokohama (JP); Akihiko Ono, Kita (JP); Masakazu Yamagiwa, Yokohama (JP); Yoshitsune Sugano, Kawasaki (JP); Ryota Kitagawa, Setagaya (JP); Jun Tamura, Chuo (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 50 days.

This patent is subject to a terminal disclaimer.

(21) Appl. No.: 15/703,112

(22) Filed: Sep. 13, 2017

(65) Prior Publication Data

US 2018/0216243 A1    Aug. 2, 2018

(30) Foreign Application Priority Data

Feb. 2, 2017    (JP) .................. 2017-017566

(51) Int. Cl.
*C25B 9/10* (2006.01)
*C25B 15/08* (2006.01)
(Continued)

(52) U.S. Cl.
CPC .............. *C25B 9/10* (2013.01); *C25B 1/10* (2013.01); *C25B 3/04* (2013.01); *C25B 9/08* (2013.01); *C25B 15/08* (2013.01); *Y02E 60/366* (2013.01)

(58) Field of Classification Search
None
See application file for complete search history.

(56) References Cited

U.S. PATENT DOCUMENTS

| 4,722,773 A | * | 2/1988 | Plowman | C25B 1/46 204/252 |
| 5,460,705 A | * | 10/1995 | Murphy | B01D 53/22 204/252 |

(Continued)

FOREIGN PATENT DOCUMENTS

| DE | 102015209509 A1 | * | 11/2016 | ............... C25B 1/04 |
| DE | 102015212504 A1 | * | 1/2017 | .............. C25B 15/08 |

(Continued)

OTHER PUBLICATIONS

Narayanan et al, Electrochemical Conversion of Carbon Dioxide to Formate in Alkaline Polymer Electrolyte Membrane Cells, Journal of the Electrochemical Society, vol. 158, No. 2, Dec. 2010, pp. A167-A173 (Year: 2011).*

(Continued)

*Primary Examiner* — Harry D Wilkins, III
(74) *Attorney, Agent, or Firm* — Oblon, McClelland, Maier & Neustadt, L.L.P.

(57) ABSTRACT

An electrolysis cell for carbon dioxide of an embodiment includes: an anode part including an anode which oxidizes water or hydroxide ions to produce oxygen and an anode solution flow path which supplies an anode solution to the anode; a cathode part including a cathode which reduces carbon dioxide to produce a carbon compound, a cathode solution flow path which supplies a cathode solution to the cathode, and a gas flow path which supplies carbon dioxide to the cathode; and a separator which separates the anode part and the cathode part. The anode has a first surface in contact with the separator, and a second surface facing the (Continued)

anode solution flow path so that the anode solution is in contact with the anode.

16 Claims, 12 Drawing Sheets

(51) Int. Cl.
*C25B 1/10* (2006.01)
*C25B 3/04* (2006.01)
*C25B 9/08* (2006.01)

(56) References Cited

U.S. PATENT DOCUMENTS

| | | | |
|---|---|---|---|
| 9,255,335 B2 | 2/2016 | Kanan et al. | |
| 10,208,385 B2* | 2/2019 | Kudo | C25B 1/04 |
| 2006/0068266 A1* | 3/2006 | Hanlon | C25B 9/04 |
| | | | 429/457 |
| 2010/0230295 A1* | 9/2010 | Taruya | C25B 1/04 |
| | | | 205/628 |
| 2013/0126336 A1 | 5/2013 | Sakai et al. | |
| 2014/0131217 A1 | 5/2014 | Buschmann | |
| 2015/0180052 A1* | 6/2015 | Leger | H01M 8/10 |
| | | | 429/457 |
| 2015/0218719 A1 | 8/2015 | Deguchi et al. | |
| 2017/0037522 A1* | 2/2017 | Kaczur | C25B 1/00 |
| 2017/0114468 A1 | 4/2017 | Buschmann | |
| 2018/0127885 A1* | 5/2018 | Krause | C25B 1/04 |
| 2018/0195184 A1* | 7/2018 | Fleischer | C25B 15/08 |
| 2018/0265440 A1* | 9/2018 | Kudo | C25B 15/02 |

FOREIGN PATENT DOCUMENTS

| | | |
|---|---|---|
| JP | 2002-30476 A | 1/2002 |
| JP | 2009-245641 A | 10/2009 |
| JP | 2012-021216 | 2/2012 |
| JP | 2012-112001 | 6/2012 |
| JP | WO 2013/089221 A1 | 6/2013 |
| JP | 5753641 | 7/2015 |
| JP | WO 2015/177950 A1 | 11/2015 |
| WO | WO 2014/202855 A1 | 12/2014 |
| WO | WO 2016/134952 A1 | 9/2016 |

OTHER PUBLICATIONS

Extended European Search Report dated Jun. 13, 2018 in European Patent Application No. 17191057.3, 13 pages.
Partial European Search Report dated Mar. 5, 2018 in corresponding European Patent Application No. 17191057.3, 13 pages.
Sichao Ma et al., "One-step Electrosynthesis of Ethylene and Ethanol from $CO_2$ in an Alkaline Electrolyzer", Journal of Power Sources; vol. 301; Jan. 1, 2016; pp. 219-228.
Zengcai Liu, et al., "Electrochemical generation of syngas from water and carbon dioxide at industrially important rates," 2016, Journal of CO2 Utilization 15, pp. 50-56.
Sichao Ma, et al., "Efficient Electrochemical Flow System with Improved Anode for the Conversion of CO2 to CO," 2014, Journal of the Electrochemical Society, 161 (10), pp. F1124-F1131.

* cited by examiner

ELECTROLYSIS CELL AND ELECTROLYTIC DEVICE FOR CARBON DIOXIDE

CROSS-REFERENCE TO RELATED APPLICATION

This application is based upon and claims the benefit of priority from Japanese Patent Application No. 2017-017566, filed on Feb. 2, 2017; the entire contents of which are incorporated herein by reference.

FIELD

Embodiments described herein generally relate to an electrolysis cell and electrolytic device for carbon dioxide.

BACKGROUND

In recent years, there has been a concern for depletion of fossil fuel such as petroleum or coal, and expectation for sustainably-usable renewable energy has been rising. As the renewable energy, a solar cell, wind power generation, and the like can be cited. Because these depend on weather and a natural situation in a power generation amount, there is a problem that stable supply of electric power is difficult. Therefore, there has been made an attempt to store the electric power generated by the renewable energy in a storage battery and stabilize the electric power. However, when the electric power is stored, there are problems that a cost is required for the storage battery and a loss occurs at a time of storage.

For such points, attention is being given to a technology of performing water electrolysis using the electric power generated by the renewable energy to produce hydrogen ($H_2$) from water or reducing carbon dioxide ($CO_2$) electrochemically to convert it into a chemical substance (chemical energy) such as a carbon compound such as carbon monoxide (CO), a formic acid (HCOOH), methanol ($CH_3OH$), methane ($CH_4$), an acetic acid ($CH_3COOH$), ethanol ($C_2H_5OH$), ethane ($C_2H_6$), or ethylene ($C_2H_4$). When these chemical substances are stored in a cylinder or a tank, as compared with when the electric power (electric energy) is stored in the storage battery, there are advantages that a storage cost of energy can be reduced and a storage loss is also small.

As an electrolytic device for carbon dioxide, for example, the structure in which a cathode solution and $CO_2$ gas are brought in contact with a cathode, and an anode solution is brought in contact with an anode is being studied. As a specific configuration of the electrolytic device, for example, there is known a structure in which an ion exchange membrane as a separator is sandwiched by a cathode solution flow path and an anode solution flow path, and the cathode and the anode are each disposed on a surface on a side opposite to a surface in contact with the separator of each of the solution flow paths. When a reaction to produce CO from $CO_2$ is performed by passing a constant current through the cathode and the anode using the electrolytic device having such a structure, there is a possibility that a trouble such as a large variation in a cell voltage occurs. At this time, there is a tendency for a voltage variation of the anode to be larger than a voltage variation of the cathode.

DETAILED DESCRIPTION

According to the embodiments of the present invention, there is provided an electrolysis cell for carbon dioxide that includes: an anode part including an anode to oxidize water or hydroxide ions and thus produce oxygen and an anode solution flow path to supply an anode solution to the anode; a cathode part including a cathode to reduce carbon dioxide and thus produce a carbon compound, a cathode solution flow path to supply a cathode solution to the cathode, and a gas flow path to supply carbon dioxide to the cathode; and a separator to separate the anode part and the cathode part. In the electrolysis cell of the embodiments, the anode has a first surface in contact with the separator, and a second surface facing the anode solution flow path so that the anode solution is in contact with the anode.

Hereinafter, an electrolysis cell and electrolytic device for carbon dioxide of embodiments will be described with reference to the drawings. In each embodiment presented below, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

(First Embodiment)

Figure 1:
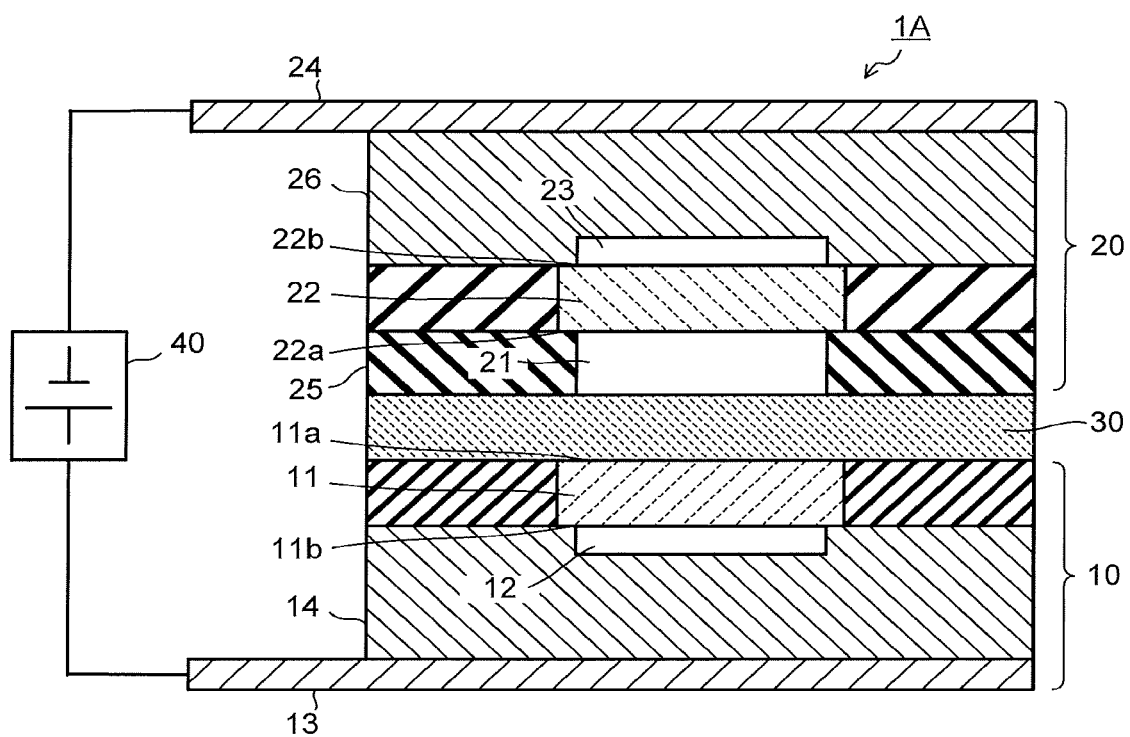
FIG. 1 is a sectional view illustrating an electrolysis cell of a first embodiment.
Figure 2:
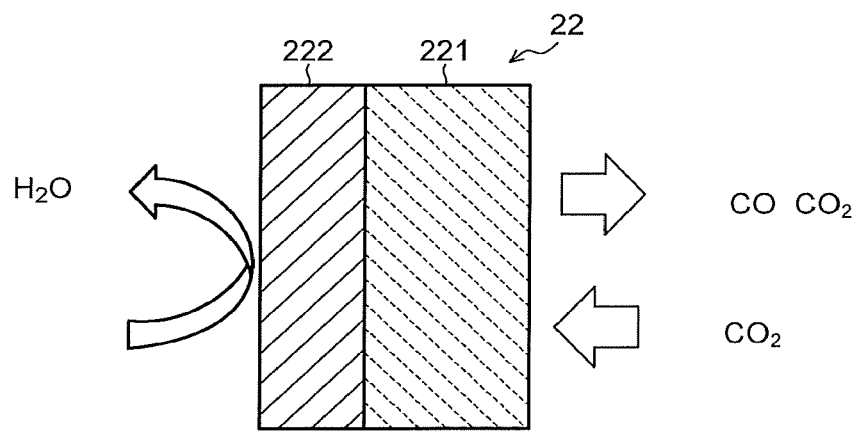
FIG. 2 is a view illustrating one example of a cathode in an electrolysis cell of embodiments.

FIG. 1 is a sectional view illustrating a configuration of an electrolysis cell for carbon dioxide according to a first embodiment. An electrolysis cell 1A for carbon dioxide illustrated in FIG. 1 includes an anode part 10, a cathode part 20, and a separator 30 as illustrated in FIG. 2. The anode part 10 includes an anode 11, an anode solution flow path 12, and an anode current collector 13. The cathode part 20 includes a cathode solution flow path 21, a cathode 22, a $CO_2$ gas flow path 23, and a cathode current collector 24. The separator 30 is disposed so as to separate the anode part 10 and the cathode part 20. The electrolysis cell 1A is sandwiched by a pair of support plates not illustrated, and further tightened by bolts or the like. In FIG. 1, a reference sign 40 is a power supply which passes an electric current through the anode 11 and the cathode 22. The electrolysis cell 1A and the power supply 40 constitute the electrolytic device for carbon dioxide of the embodiment. The power supply 40 is not limited to a normal commercial power supply, battery, or the like, and may supply electric power generated by renewable energy such as a solar cell or wind power generation.

The anode 11 is an electrode (oxidation electrode) which causes an oxidation reaction of water ($H_2O$) in an anode solution to produce oxygen ($O_2$) or hydrogen ions ($H^+$), or causes an oxidation reaction of hydroxide ions ($OH^-$) produced in the cathode part 20 to produce oxygen ($O_2$) or water ($H_2O$). The anode 11 has a first surface 11a in contact with the separator 30 and a second surface 11b facing the anode solution flow path 12. The first surface 11a of the anode 11 is in close contact with the separator 30. The anode solution flow path 12 supplies the anode solution to the anode 11, and is constituted by a pit (groove portion/concave portion) provided in a first flow path plate 14. To the first flow path plate 14, a solution inlet port and a solution outlet port whose illustrations are omitted are connected, and via these solution inlet port and solution outlet port, the anode solution is introduced and discharged by an unillustrated pump. The anode solution flows through in the anode solution flow path 12 so as to be in contact with the anode 11. The anode current collector 13 is electrically in contact with a surface on a side opposite to the anode 11 of the first flow path plate 14 constituting the anode solution flow path 12.

The anode 11 is preferably mainly constituted of a catalyst material (anode catalyst material) capable of oxidizing water ($H_2O$) to produce oxygen or hydrogen ions or oxidizing hydroxide ions ($OH^-$) to produce water or oxygen, and capable of reducing an overvoltage of the above reaction. As such a catalyst material, there can be cited a metal such as platinum (Pt), palladium (Pd), or nickel (Ni), an alloy or an intermetallic compound containing the above metals, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, or a metal complex such as a Ru complex or a Fe complex.

The anode 11 includes a base material having a structure capable of moving the anode solution or ions between the separator 30 and the anode solution flow path 12, for example, a porous structure such as a mesh material, a punching material, a porous body, or a metal fiber sintered body. The base material may be constituted of a metal such as titanium (Ti), nickel (Ni), or iron (Fe), or a metal material such as an alloy (for example, SUS) containing at least one of these metals, or may be constituted of the above-described anode catalyst material. When the oxide is used as the anode catalyst material, the anode catalyst material preferably adheres to or is stacked on a surface of the base material constituted of the above-described metal material to form a catalyst layer. The anode catalyst material preferably has nanoparticles, a nanostructure, a nanowire, or the like for the purpose of increasing the oxidation reaction. The nanostructure is a structure in which nanoscale irregularities are formed on a surface of the catalyst material.

The cathode 22 is an electrode (reduction electrode) which causes a reduction reaction of carbon dioxide ($CO_2$) or a reduction reaction of a carbon compound produced thereby to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). The cathode 22 has a first surface 22a facing the cathode solution flow path 21 and a second surface 22b facing the $CO_2$ gas flow path 23. The cathode solution flow path 21 is disposed between the cathode 22 and the separator 30 so that the cathode solution is in contact with the cathode 22 and the separator 30.

The cathode solution flow path 21 is constituted by an opening portion provided in a second flow path plate 25. To the second flow path plate 25, a solution inlet port and a solution outlet port whose illustrations are omitted are connected, and via these solution inlet port and solution outlet port, the cathode solution is introduced and discharged by an unillustrated pump. The cathode solution flows through in the cathode solution flow path 21 so as to be in contact with the cathode 22 and the separator 30. The $CO_2$ gas flow path 23 is constituted by a pit (groove portion/concave portion) provided in a third flow path plate 26. To the third flow path plate 26, a gas inlet port and a gas outlet port whose illustrations are omitted are connected, and via these gas inlet port and gas outlet port, gas (sometimes referred to simply as $CO_2$ gas.) containing $CO_2$ is introduced and discharged by an unillustrated flow rate controller. The gas containing $CO_2$ flows through in the $CO_2$ gas flow path 23 so as to be in contact with the cathode 22. The cathode current collector 24 is electrically in contact with a surface on a side opposite to the cathode 22 of the third flow path plate 26.

Figure 3:
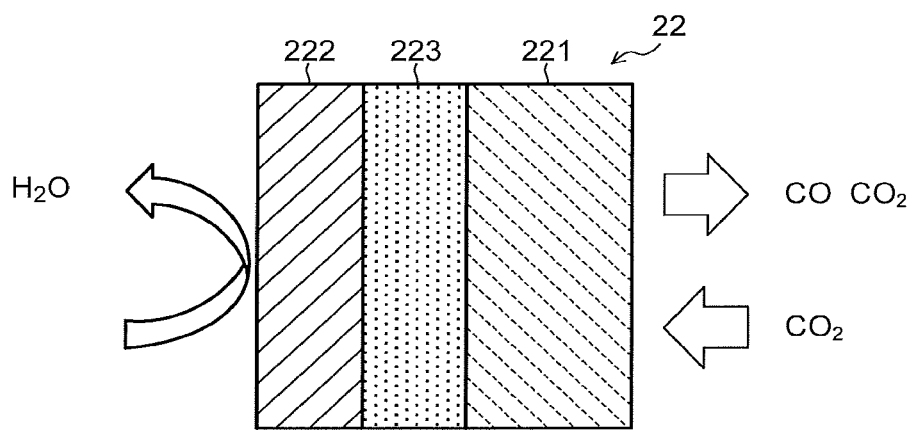
FIG. 3 is a view illustrating the other example of the cathode in the electrolysis cell of the embodiments.
Figure 4:
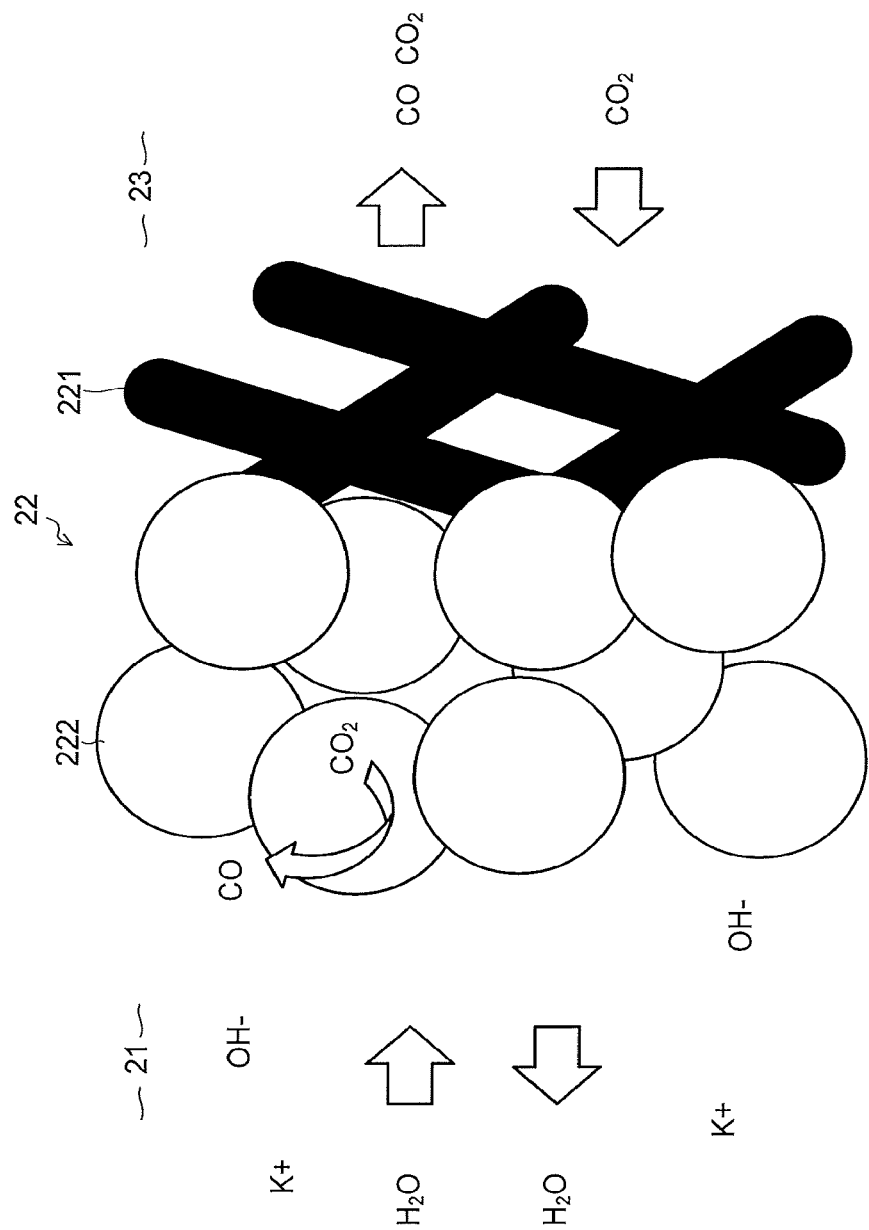
FIG. 4 is a view illustrating a reaction in the cathode in the electrolysis cell of the embodiments.

The cathode 22 has a gas diffusion layer 221 and a cathode catalyst layer 222 provided thereon as illustrated in FIG. 2. Between the gas diffusion layer 221 and the cathode catalyst layer 222, as illustrated in FIG. 3, a porous layer 223 denser than the gas diffusion layer 221 may be disposed. As illustrated in FIG. 4, the gas diffusion layer 221 is disposed on the $CO_2$ gas flow path 23 side, and the cathode catalyst layer 222 is disposed on the cathode solution flow path 21 side. The cathode catalyst layer 222 preferably has catalyst nanoparticles, a catalyst nanostructure, or the like. The gas diffusion layer 221 is constituted by carbon paper, carbon cloth, or the like, for example, and subjected to water repellent treatment. The porous layer 223 is constituted by a porous body whose pore size is smaller than that of the carbon paper or the carbon cloth.

As illustrated in a schematic view in FIG. 4, in the cathode catalyst layer 222, the cathode solution or ions are supplied and discharged from the cathode solution flow path 21, and in the gas diffusion layer 221, the $CO_2$ gas is supplied from the $CO_2$ gas flow path 23 and further a product by the reduction reaction of the $CO_2$ gas is discharged. By subjecting the gas diffusion layer 221 to moderate water repellent treatment, the $CO_2$ gas reaches the cathode catalyst layer 222 mainly owing to gas stirring. The reduction reaction of $CO_2$ or the reduction reaction of a carbon compound produced thereby occurs in the vicinity of a boundary between the gas diffusion layer 221 and the cathode catalyst layer 222, a gaseous product is discharged mainly from the $CO_2$ gas flow path 23, and a liquid product is discharged mainly from the cathode solution flow path 21.

The cathode catalyst layer 222 is preferably constituted of a catalyst material (cathode catalyst material) capable of reducing carbon dioxide to produce a carbon compound and further reducing the carbon compound produced thereby to produce a carbon compound as necessary, and capable of reducing an overvoltage of the above reaction. As such a material, there can be cited a metal such as gold (Au), silver (Ag), copper (Cu), platinum (Pt), palladium (Pd), nickel (Ni), cobalt (Co), iron (Fe), manganese (Mn), titanium (Ti), cadmium (Cd), zing (Zn), indium (In), gallium (Ga), lead (Pb), or tin (Sn), a metal material such as an alloy or an intermetallic compound containing at least one of the above metals, a carbon material such as carbon (C), graphene, CNT (carbon nanotube), fullerene, or ketjen black, or a metal complex such as a Ru complex or a Re complex. To the cathode catalyst layer 222, various shapes such as a plate shape, a mesh shape, a wire shape, a particle shape, a porous shape, a thin film shape, and an island shape can be applied.

The cathode catalyst material constituting the cathode catalyst layer 222 preferably has nanoparticles of the above-described metal material, a nanostructure of the metal material, a nanowire of the metal material, or a composite body in which the nanoparticles of the above-described metal material are supported by a carbon material such as carbon particles, a carbon nanotube, or graphene particles. Applying catalyst nanoparticles, a catalyst nanostructure, a catalyst nanowire, a catalyst nano-support structure, or the like as the cathode catalyst material makes it possible to enhance reaction efficiency of the reduction reaction of carbon dioxide in the cathode 22.

The separator 30 is constituted of an ion exchange membrane or the like capable of moving ions between the anode 11 and the cathode 22 and separating the anode part 10 and the cathode part 20. As the ion exchange membrane, for example, a cation exchange membrane such as Nafion or Flemion, or an anion exchange membrane such as Neosepta, or Selemion can be used. As described later, when an alkaline solution is used as the anode solution or the cathode solution and it is assumed that hydroxide ions ($OH^-$) move mainly, the separator 30 is preferably constituted of the anion exchange membrane. Also other than the ion exchange membrane, a glass filter, a porous polymeric membrane, a porous insulating material, or the like may be applied to the separator 30 as long as they are a material capable of moving ions between the anode 11 and the cathode 22.

The anode solution and the cathode solution are preferably a solution containing at least water ($H_2O$). Because carbon dioxide ($CO_2$) is supplied from the $CO_2$ gas flow path 23, the cathode solution may contain or need not contain carbon dioxide ($CO_2$). To the anode solution and the cathode solution, the same solution may be applied or different solutions may be applied. As a solution used as the anode solution and the cathode solution and containing $H_2O$, for example, an aqueous solution containing an arbitrary electrolyte can be cited. As the aqueous solution containing the electrolyte, for example, there can be cited an aqueous solution containing at least one ion selected from a hydroxide ion ($OH^-$), a hydrogen ion ($H^+$), a potassium ion ($K^+$), a sodium ion ($Na^+$), a lithium ion ($Li^+$), a cesium ion ($Cs^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), and a hydrogen carbonate ion ($HCO_3^-$) In order to reduce electrical resistance of the solution, as the anode solution and the cathode solution, an alkaline solution in which an electrolyte such as a potassium hydroxide or a sodium hydroxide is dissolved in high concentration is preferably used.

For the cathode solution, an ionic liquid which is made of salts of cations such as imidazolium ions or pyridinium ions and anions such as $BF_4^-$ or $PF_6^-$ and which is in a liquid state in a wide temperature range, or its aqueous solution may be used. As another cathode solution, there can be cited an amine solution of ethanolamine, imidazole, pyridine, or the like, or an aqueous solution thereof. As amine, any of primary amine, secondary amine, and tertiary amine is applicable.

For the first flow path plate 14 constituting the anode solution flow path 12 and the third flow path plate 26 constituting the $CO_2$ gas flow path, a material having low chemical reactivity and high conductivity is preferably used. As such a material, a metal material such as Ti or SUS, carbon, or the like can be cited. For the second flow path plate 25 constituting the cathode solution flow path 21, a material having low chemical reactivity and having no conductivity is preferably used. As such a material, there can be cited an insulating resin material such as an acrylic resin, polyetheretherketone (PEEK), or a fluorocarbon resin.

Figure 5:
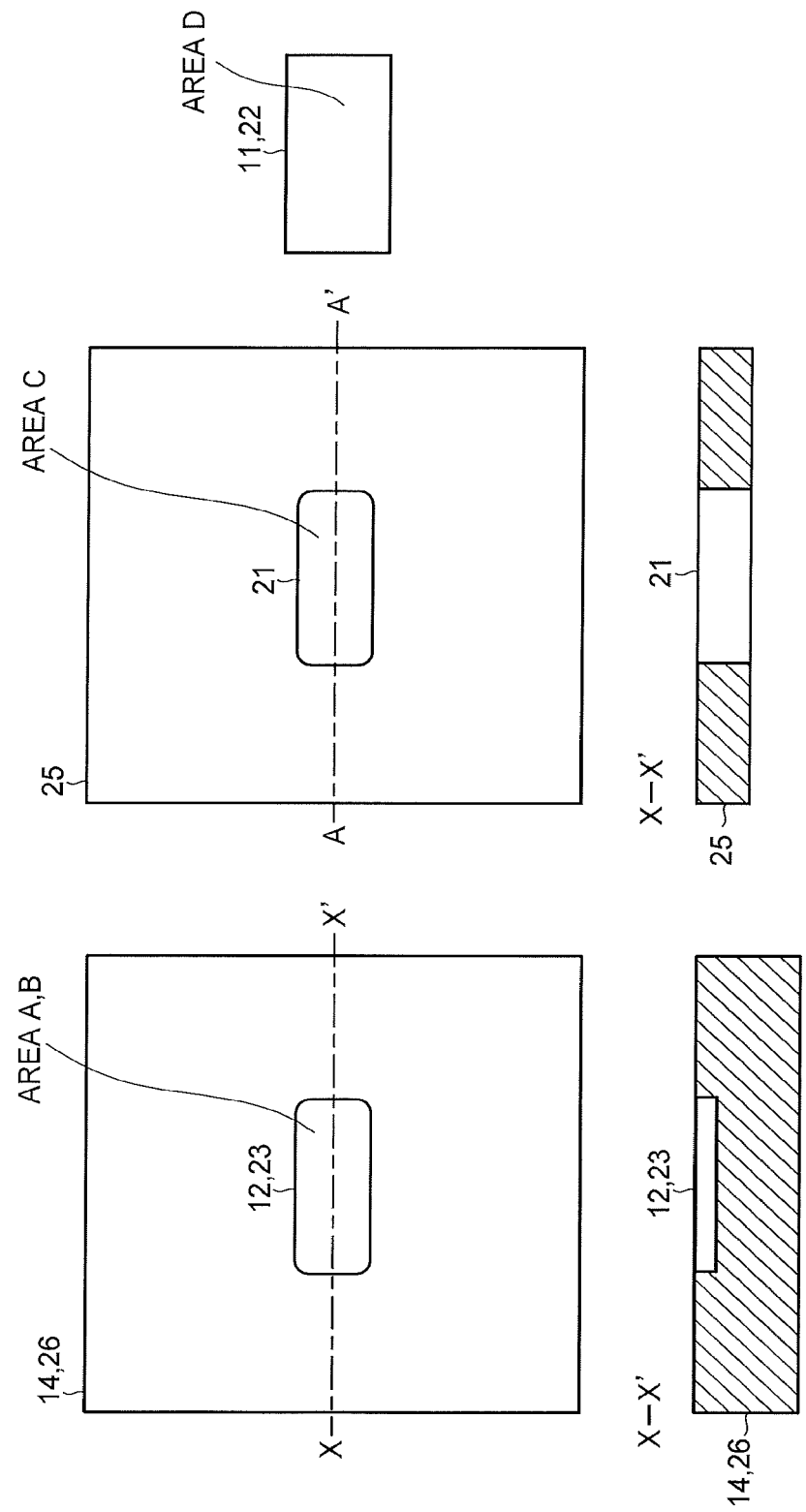
FIG. 5 is a view illustrating an anode solution flow path, a $CO_2$ gas flow path, a cathode solution flow path, an anode, and a cathode in the electrolysis cell of the first embodiment.

In order to sandwich and mechanically retain the anode part 10, the separator 30, and the cathode part 20, and obtain electrical continuity between the anode current collector 13 and the cathode current collector 24, when a pit area (flow path area of the anode solution flow path 12) A of the first flow path plate 14 through which the anode solution flows and a pit area (flow path area of the $CO_2$ gas flow path 23) B of the third flow path plate 26 through which the gas containing $CO_2$ flows are made substantially the same, these flow path areas A and B are preferably smaller than an electrode area D of the anode 11 and the cathode 22 as illustrated in FIG. 5. From the viewpoint of mechanical retention, a pit area (flow path area of the cathode solution flow path 21) C of the second flow path plate 25 through which the cathode solution flows is preferably substantially the same as the flow path area A of the anode solution flow path 12 and the flow path area B of the $CO_2$ gas flow path 23. Here, substantially the same area indicates that practically the same area is held except a difference in an area due to mechanical processing accuracy.

In the cathode 22, the reduction reaction of $CO_2$ occurs mainly in a portion in contact with the cathode solution. Therefore, in order to cause the reduction reaction of $CO_2$ efficiently, a ratio (C/D) of the flow path area C of the cathode solution flow path 21 to the electrode area D of the cathode 22 is preferably 0.5 or more, and further preferably 0.6 or more. However, when the flow path area C of the cathode solution flow path 21 becomes too large, there is a possibility that the mechanical retention and preservation of the electrical continuity become difficult. Therefore, the area ratio C/D is preferably 0.9 or less, and further preferably 0.8 or less. Note that in each of the first flow path plate 14, the second flow path plate 25, and the third flow path plate 26, an inlet port and an outlet port for a solution or gas, screw holes for tightening, and the like, whose illustrations are omitted, are provided. Further, in front of and behind each of the flow path plates 14, 25, and 26, packing whose illustration is omitted is sandwiched as necessary.

Next, an operation of the electrolytic device using the electrolysis cell 1A for carbon dioxide of the embodiment will be described. Here, a case of producing carbon monoxide (CO) as the carbon compound is mainly described, but the carbon compound as the reduction product of carbon dioxide is not limited to carbon monoxide. The carbon compound may be methane ($CH_4$), ethane ($C_2H_6$), ethylene ($C_2H_4$), methanol ($CH_3OH$), ethanol ($C_2H_5OH$), ethylene glycol ($C_2H_6O_2$), or the like as described above, and further carbon monoxide which is the reduction product may be further reduced to produce the organic compounds as described above. Further, as a reaction process by the electrolysis cell 1A, a case of mainly producing hydrogen ions (H$^+$) and a case of mainly producing hydroxide ions (OH$^-$) are considered, but it is not limited to either of these reaction processes.

First, the reaction process in a case of mainly oxidizing water (H$_2$O) to produce hydrogen ions (H$^+$) is described. When an electric current is supplied from the power supply 40 between the anode 11 and the cathode 22, the oxidation reaction of water (H$_2$O) occurs in the anode 11 in contact with the anode solution. Specifically, as indicated by the following (1) formula, H$_2$O contained in the anode solution is oxidized and oxygen (O$_2$) and hydrogen ions (H$^+$) are produced.

$$2H_2O \rightarrow 4H^+ + O_2 + 4e^- \tag{1}$$

H$^+$ produced in the anode 11 moves in the anode solution existing in the anode 11, the separator 30, and the cathode solution in the cathode solution flow path 21 and reaches the vicinity of the cathode 22. The reduction reaction of carbon dioxide (CO$_2$) occurs by electrons (e$^-$) based on the electric current which is supplied from the power supply 40 to the cathode 22 and H$^+$ which moves to the vicinity of the cathode 22. Specifically, as indicated by the following (2) formula, CO$_2$ supplied from the CO$_2$ gas flow path 23 to the cathode 22 is reduced and CO is produced.

$$2CO_2 + 4H^+ + 4e^- \rightarrow 2CO + 2H_2O \tag{2}$$

Next, the reaction process in a case of mainly reducing carbon dioxide (CO$_2$) to produce hydroxide ions (OH$^-$) is described. When an electric current is supplied from the power supply 40 between the anode 11 and the cathode 22, in the vicinity of the cathode 22, as indicated by the following (3) formula, water (H$_2$O) and carbon dioxide (CO$_2$) are reduced and carbon monoxide (CO) and hydroxide ions (OH$^-$) are produced. The hydroxide ions (OH$^-$) diffuse in the vicinity of the anode 11, and as indicated by the following (4) formula, the hydroxide ions (OH$^-$) are oxidized and oxygen (O$_2$) is produced.

$$2CO_2 + 2H_2O + 4e^- \rightarrow 2CO + 4OH^- \tag{3}$$

$$4OH^- \rightarrow 2H_2O + O_2 + 4e^- \tag{4}$$

In both of the above-described reaction process in which hydrogen ions (H$^+$) are mainly produced and reaction process in which hydroxide ions (OH$^-$) are mainly produced, oxygen (O$_2$) is produced in the anode 11. In a cell structure in which a conventional separator is sandwiched by a cathode solution flow path and an anode solution flow path, air bubbles of oxygen (O$_2$) gas which occur in the anode 11 stay in the anode solution flow path, and cell resistance between the anode and the separator (ion exchange membrane or the like) is increased, and thereby a voltage variation of the anode is considered to become large. In contrast to this, in the electrolysis cell 1A of the embodiment, the anode solution flow path 12 is not disposed between the anode 11 and the separator 30, and the anode 11 and the separator 30 are brought in close contact with each other, and therefore oxygen gas which occurs in the anode 11 is discharged to the anode solution flow path 12 together with the anode solution. Therefore, it is possible to prevent the oxygen gas from staying between the anode 11 and the separator 30. Accordingly, it becomes possible to suppress a variation in a cell voltage due to the voltage variation of the anode.

(Second Embodiment)

Figure 6:
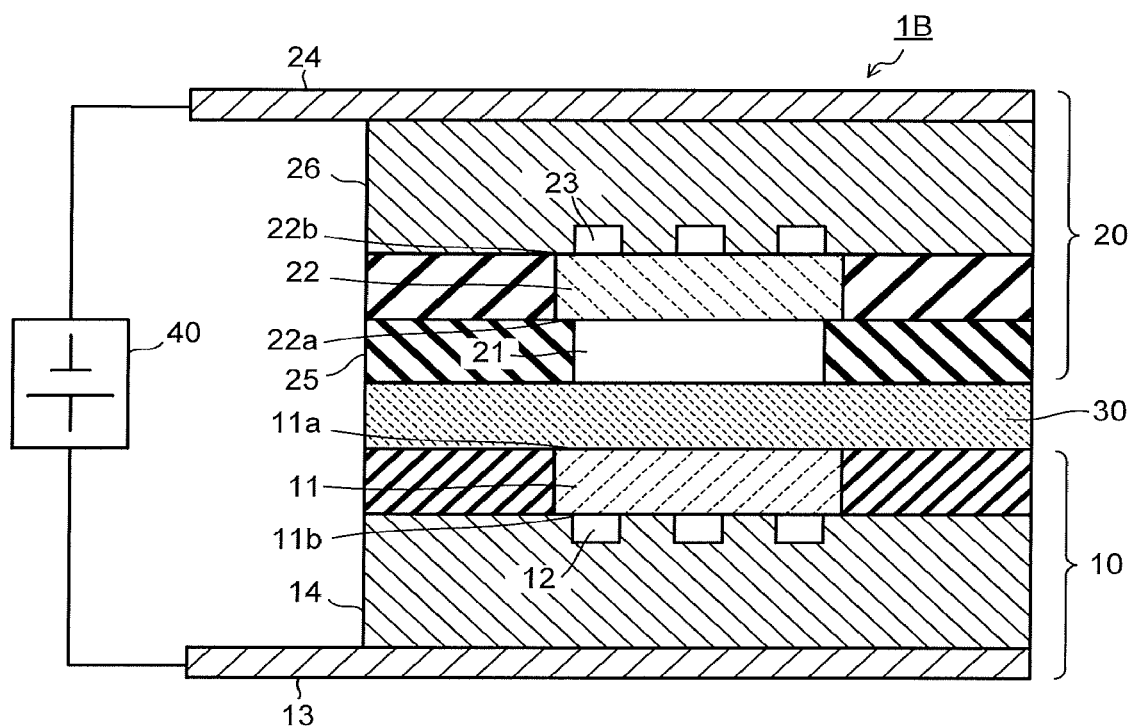
FIG. 6 is a sectional view illustrating an electrolysis cell of a second embodiment.

Next, with reference to FIG. 6 to FIG. 8, an electrolysis cell for carbon dioxide according to a second embodiment will be described. An electrolysis cell 1B for carbon dioxide illustrated in FIG. 6 includes an anode part 10, a cathode part 20, and a separator 30, similarly to the first embodiment. A configuration of the anode part 10, the cathode part 20, and the separator is the same as that in the first embodiment. The electrolysis cell 1B is sandwiched by a pair of support plates not illustrated, and further tightened by bolts or the like, similarly to the first embodiment. In the electrolysis cell 1B illustrated in FIG. 6, to an anode 11 and a cathode 22, an electric current is supplied from a power supply 40 via an anode current collector 13 and a cathode current collector 24, similarly to the first embodiment. The electrolysis cell 1B and the power supply 40 constitute an electrolytic device for carbon dioxide according to the second embodiment.

Figure 7:
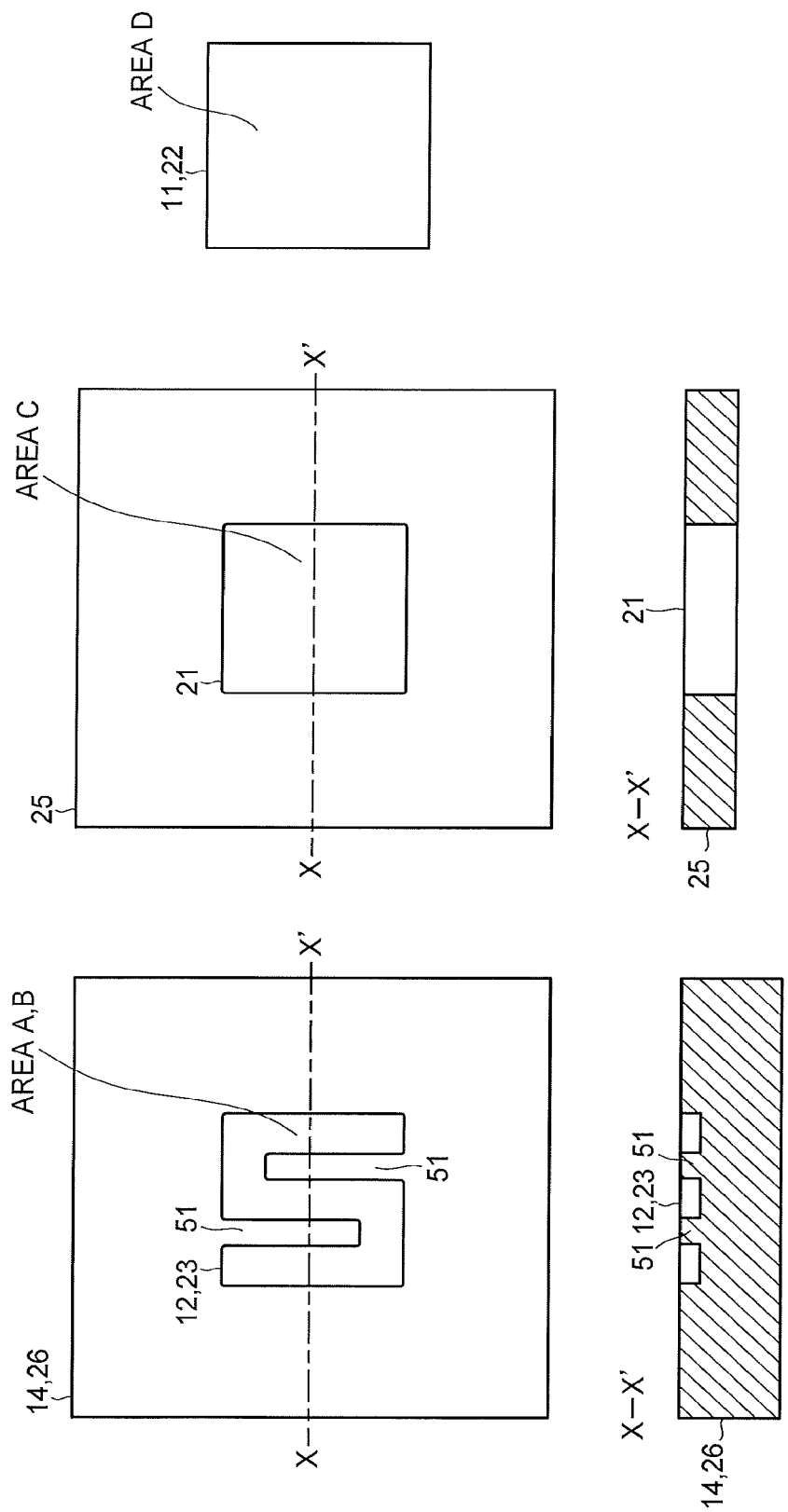
FIG. 7 is a view illustrating a first example of an anode solution flow path, a $CO_2$ gas flow path, a cathode solution flow path, an anode, and a cathode in the electrolysis cell of the second embodiment.

In the electrolysis cell 1B of the second embodiment, as illustrated in FIG. 7, a plurality of lands (convex portions) 51 are provided along an anode solution flow path 12 and a CO$_2$ gas flow path 23, and this point is different from the electrolysis cell 1A of the first embodiment. The lands 51 are provided for the mechanical retention and the electrical continuity. The lands 51 are preferably provided alternately to uniformize flow of an anode solution and gas containing CO$_2$. The above lands 51 make the anode solution flow path 12 and the CO$_2$ gas flow path 23 serpentine. Moreover, also for a good discharge of the anode solution in which oxygen (O$_2$) gas is mixed, the lands 51 are preferably provided alternately along the anode solution flow path 12 to make the anode solution flow path 12 serpentine.

On the other hand, because the reduction reaction of carbon dioxide (CO$_2$) occurs mainly in the portion where the cathode 22 and the cathode solution are in contact with each other, the number of lands in a cathode solution flow path 21 is preferably small, and further as long as the mechanical retention and the electrical continuity are secured, a land is not preferably provided in the cathode solution flow path 21 as illustrated in FIG. 7. However, in order to secure the mechanical retention and the electrical continuity, the land may be provided in the cathode solution flow path 21 as described later. Further, for the mechanical retention and the electrical continuity, an electrode area D of the anode 11 and the cathode 22 is preferably made larger than a flow path area C of the cathode solution flow path 21. A ratio (C/D) of the flow path area C to the electrode area D is preferably the same as that in the first embodiment.

Figure 8:
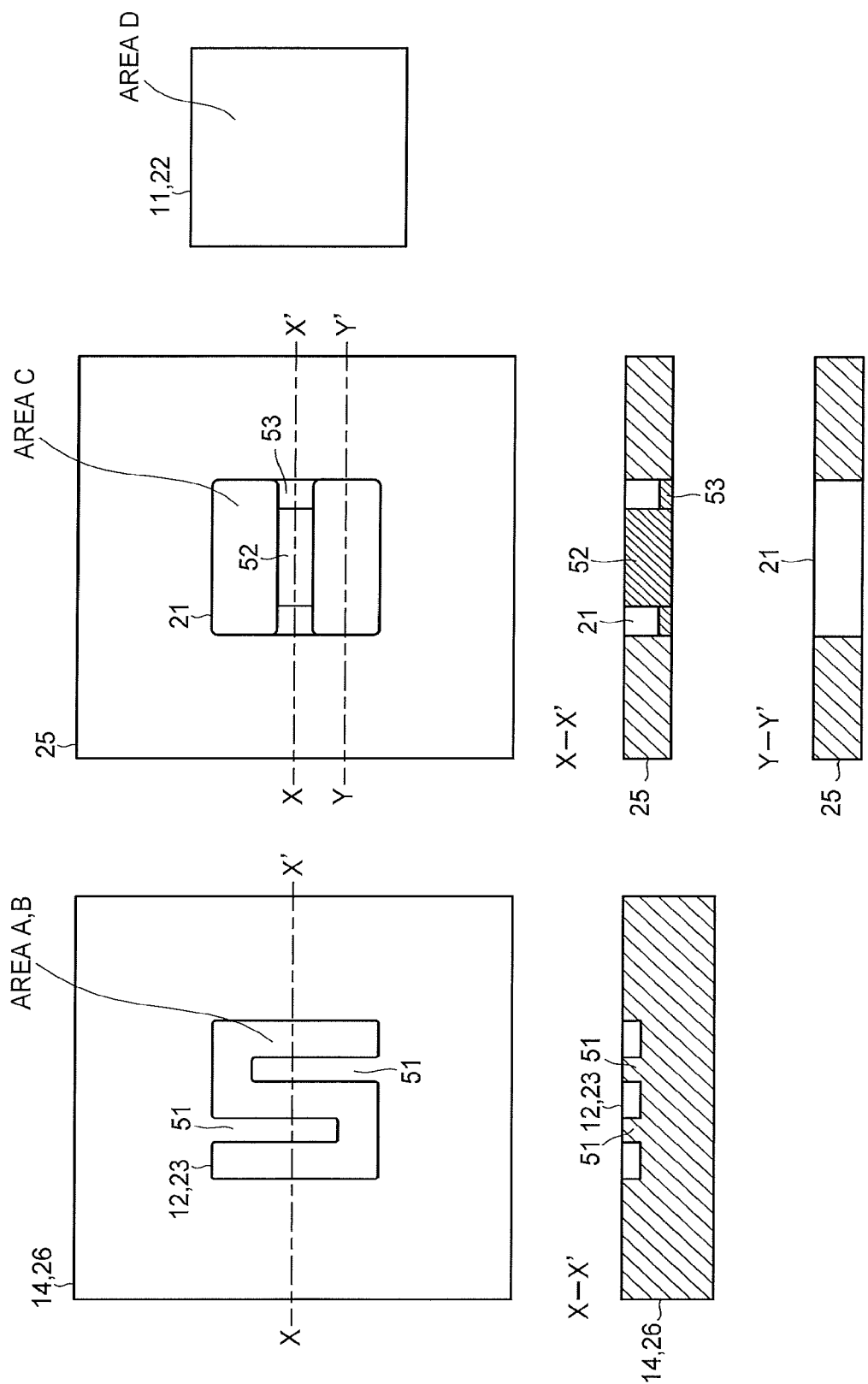
FIG. 8 is a view illustrating a second example of the anode solution flow path, the $CO_2$ gas flow path, the cathode solution flow path, the anode, and the cathode in the electrolysis cell of the second embodiment.

As illustrated in FIG. 8, a land (convex portion) 52 may be provided in the cathode solution flow path 21. The land 52 in the cathode solution flow path 21 is provided for the mechanical retention and the electrical continuity. The land 52 is provided in a center portion of the cathode solution flow path 21, and is retained to a second flow path plate 25 by a bridge portion 53 thinner than the land 52 so as not to prevent the cathode solution in the cathode solution flow path 21 from flowing through. The lands 51 of the anode solution flow path 12 and the CO$_2$ gas flow path 23 have the same configuration as that in FIG. 7. When the land 52 is provided in the cathode solution flow path 21, the land 52 is preferably disposed so that its longitudinal direction is orthogonal to a longitudinal direction of the lands 51. In order to reduce cell resistance, the number of lands 52 is preferably small. Even in such a case, in order to improve the mechanical retention and the electrical continuity, the longitudinal direction of the land 52 and the longitudinal direction of the lands 51 are preferably made orthogonal to each other.

In the electrolysis cell 1B of the second embodiment, similarly to the first embodiment, the anode solution flow path 12 is not disposed between the anode 11 and the separator 30, and the anode 11 and the separator 30 are brought in close contact with each other, and therefore oxygen gas which occurs in the anode 11 is discharged to the anode solution flow path 12 together with the anode solution. Therefore, it is possible to prevent the oxygen gas from staying between the anode 11 and the separator 30. Accordingly, it becomes possible to suppress a variation in a cell voltage due to a voltage variation of the anode. Moreover, providing the lands 51 along the anode solution flow path 12 and the $CO_2$ gas flow path 23 makes it possible to increase a contact area between the anode 11 and a first flow path plate 14 constituting the anode solution flow path 12 and a contact area between the cathode 22 and a third flow path plate 26 constituting the $CO_2$ gas flow path 23. Further, providing the land 52 in the cathode solution flow path 21 makes it possible to increase a contact area between the cathode 22 and a second flow path plate 25 constituting the cathode solution flow path 21. These make electrical continuity between the anode current collector 13 and the cathode current collector 24 good while enhancing mechanical retentivity of the electrolysis cell 1B, and make it possible to improve reduction reaction efficiency of $CO_2$, or the like.

(Third Embodiment)

Next, with reference to FIG. 9, an electrolysis cell for carbon dioxide according to a third embodiment will be described. An electrolysis cell 1C for carbon dioxide illustrated in FIG. 9 includes an anode part 10, a cathode part 20, and a separator 30, similarly to the second embodiment. A configuration of the anode part 10, the cathode part 20, and the separator is the same as that in the first embodiment. The electrolysis cell 1C illustrated in FIG. 9 has an anode 11 and a cathode 22 each having a larger area compared with the electrolysis cell 1B of the second embodiment, and this point is different from the electrolysis cell 1B of the second embodiment.

An anode solution flow path 12, a cathode solution flow path 21, and a $CO_2$ gas flow path 23 each have a flow path area corresponding to the anode 11 and the cathode 22 each having a large area. Therefore, a plurality of lands 51 are provided along the anode solution flow path 12 and the $CO_2$ gas flow path 23. A specific configuration of the lands 51 is made the same as that of the second embodiment. Moreover a land 52 is also provided in the cathode solution flow path 21. A specific configuration of the land 52 is also the same as the land 52 of the second embodiment illustrated in FIG. 8.

In the lands 51 of the anode solution flow path 12 and the $CO_2$ gas flow path 23, a plurality of lands are preferably provided along each of the flow paths in order to uniformize flow of an anode solution and $CO_2$ gas and increase the mechanical retention and the electrical continuity. Regarding the land 52 of the cathode solution flow path 21, the number thereof is preferably small in order to suppress a reduction in a contact area between the cathode 22 and a cathode solution. Specifically, a ratio (F/E) of the number F of the lands 51 to the number E of the lands 52 is preferably two or more, more preferably three or more, and further preferably five or more. However, because a too large F/E ratio decreases mechanical retentivity, the F/E ratio is preferably 20 or less, and further preferably ten or less. Disposed positions of the lands 51 and the land 52 may be orthogonal to one another or parallel to one another, but it is preferable to make them orthogonal to one another from the point of the mechanical retention and the electrical continuity. When the land 52 is disposed in parallel with the lands 51, a position of the land 52 is preferably disposed for the mechanical retention so as to overlap a partial position of the lands 51.

(Fourth Embodiment)

Figure 10:
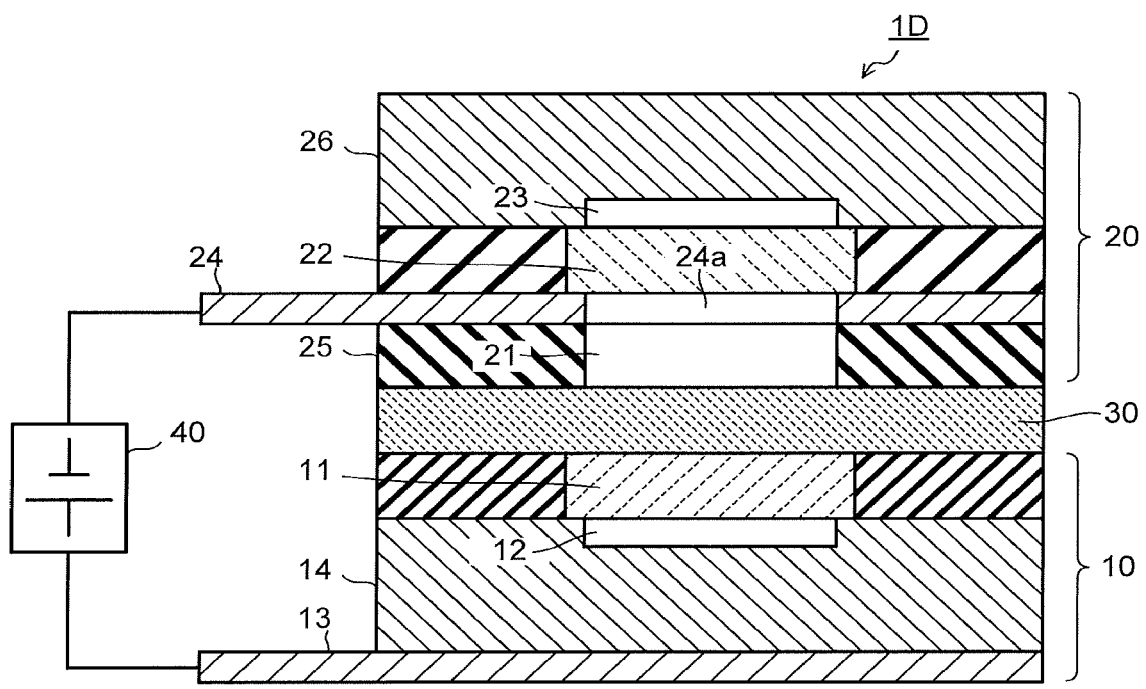
FIG. 10 is a sectional view illustrating an electrolysis cell of a fourth embodiment.
Figure 11:
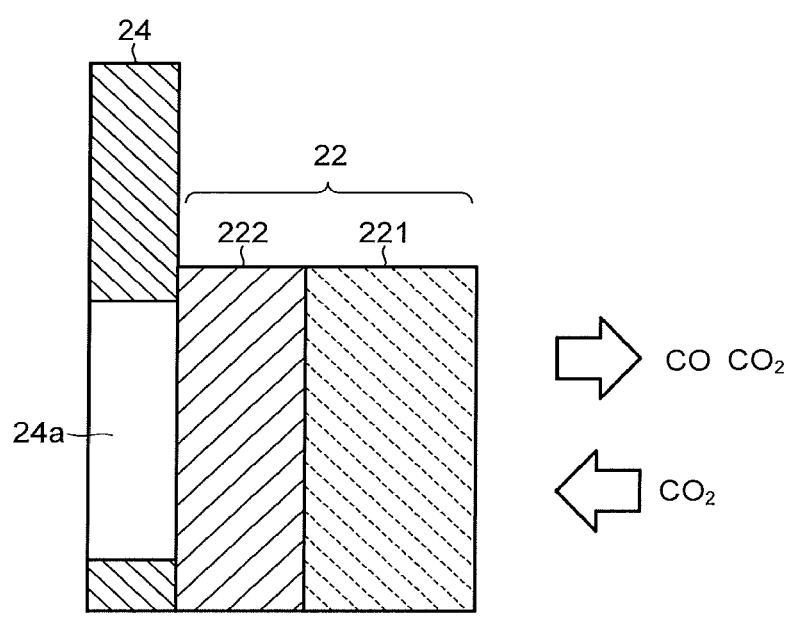
FIG. 11 is a sectional view illustrating a cathode and a cathode current collector in the electrolysis cell of the fourth embodiment.

Next, with reference to FIG. 10 and FIG. 11, an electrolysis cell for carbon dioxide according to a fourth embodiment will be described. An electrolysis cell 1D for carbon dioxide illustrated in FIG. 10 includes an anode part 10, a cathode part 20, and a separator 30, similarly to the first embodiment. A configuration of the anode part 10, the cathode part 20, and the separator is the same as that in the first embodiment. In the electrolysis cell 1D illustrated in FIG. 10, a cathode current collector 24 is disposed between a second flow path plate 25 constituting a cathode solution flow path 21 and a cathode 22, and this point is different from the electrolysis cell 1A of the first embodiment. FIG. 11 illustrates the cathode current collector 24 and the cathode 22.

The cathode current collector 24 is in contact with a cathode catalyst layer 222 of the cathode 22 as illustrated FIG. 11 and is thereby electrically conducted. When the cathode current collector 24 is disposed between the second flow path plate 25 and the cathode 22, an opening portion 24a is provided in the cathode current collector 24 so as not to prevent contact of a cathode solution flowing through the cathode solution flow path 21 with the cathode 22. The cathode solution flowing through the cathode solution flow path 21 is enabled to be contact with the cathode 22 via the opening portion 24a. In order to reduce cell resistance, a distance between the cathode 22 and the separator 30 is preferably short. Therefore, a thickness of the cathode current collector 24 is preferably thin, and specifically, preferably 1 mm or less and further preferably 0.3 mm or less.

For the cathode current collector 24, a material having low chemical reactivity and high conductivity is preferably used. As such a material, a metal material such as Ti or SUS, carbon, or the like can be cited. Further, disposing the cathode current collector 24 between the second flow path plate 25 and the cathode 22 makes it possible to use a material having low conductivity as a material of a gas diffusion layer 221 of the cathode 22 and a third flow path plate 26 constituting the $CO_2$ gas flow path 23. For example, a porous sheet made of a polymeric material such as a fluorocarbon resin having good water repellency can be applied to the gas diffusion layer 221. To the third flow path plate 26 constituting the $CO_2$ gas flow path 23, an insulating resin material such as an acrylic resin, polyetheretherketone (PEEK), or a fluorocarbon resin can be applied.

EXAMPLE

Next, an example and its evaluation result will be described.

Example 1

Figure 9:
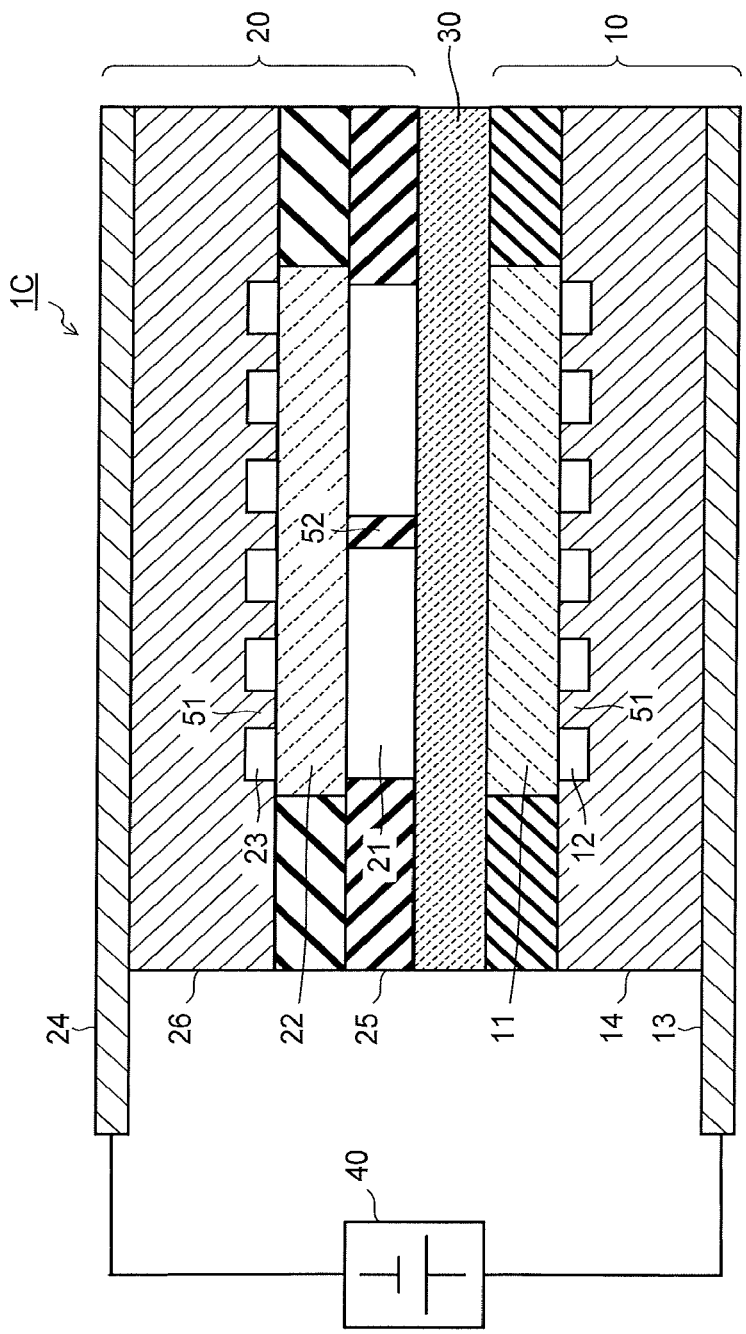
FIG. 9 is a sectional view illustrating an electrolysis cell of a third embodiment.

The electrolysis cell 1C for carbon dioxide, whose configuration was illustrated in FIG. 9, was fabricated, and electrolysis performance for carbon dioxide was examined. That is, an electrolytic device is constituted by connecting a solution system and a gas system illustrated in FIG. 12 to the electrolysis cell 1C illustrated in FIG. 9, and the electrolysis performance for carbon dioxide was examined. In the electrolytic device illustrated in FIG. 12, a first solution system having a pressure control unit 61, an anode solution tank 62, a flow rate control unit (pump) 63, and a reference electrode 64 is connected to the anode solution flow path 12, and a configuration is made so that an anode solution circulates in the anode solution flow path 12.

A second solution system having a pressure control unit 65, a solution separation unit 66, a cathode solution tank 67, a flow rate control unit (pump) 68, and a reference electrode 69 is connected to the cathode solution flow path 21, and a configuration is made so that a cathode solution circulates in the cathode solution flow path 21. $CO_2$ gas is introduced from a $CO_2$ gas cylinder 71 via a flow rate control unit 70 to the $CO_2$ gas flow path 23. The $CO_2$ gas flowing through the $CO_2$ gas flow path 23 is sent from an unillustrated gas inlet port via a pressure control unit 72 to a gas/liquid separation unit 73, and further sent to a product collection unit 74. An electrolysis cell performance detection unit 75 is provided for the product collection unit 74. Part of the first and second solution systems is connected to the product collection unit 74 and a waste solution tank 76. An operation of each of the units is controlled by a data collection control unit 77.

For an anode, an electrode in which $IrO_2$ nanoparticles which became a catalyst were applied to Ti mesh was used. As the anode, the one in which $IrO_2$/Ti mesh was cut into 2×2 cm was used.

For a cathode catalyst layer, a coating layer of gold nanoparticle-supported carbon particles was used. For a gas diffusion layer, carbon paper having a MPL (microporous layer) was used. A cathode was produced by the following process. First, a coating solution in which the gold nanoparticle-supported carbon particles and pure water, a Nafion solution, and ethylene glycol were mixed was produced. An average particle diameter of the gold nanoparticle was 8.7 nm, and a supported amount thereof was 18.9 mass %. An air brush was filled with this coating solution, and spray coating was performed using nitrogen gas on the carbon paper on which the MPL was provided. Flowing water washing was performed by pure water for 30 minutes after the coating, and thereafter organic matter such as ethylene glycol was removed by oxidation through immersing in a hydrogen peroxide solution, A resultant object was cut into a size of 2×2 cm to be set as the cathode (electrode area D=4 $cm^2$). Note that a coating amount of Au was estimated at about 0.2 $mg/cm^2$ from a mixing amount of the gold nanoparticles and the carbon particles in the coating solution.

The electrolysis cell 1C was produced by being stacked in order of the cathode current collector 24, the $CO_2$ gas flow path 23 (the third flow path plate 26), the cathode 22, the cathode solution flow path 21 (the second flow path plate 25), the separator 30, the anode 11, the anode solution flow path 12 (the first flow path plate 14), and the anode current collector 13 from the top, being sandwiched by the support plates not illustrated, and further being tightened by the bolts, as illustrated in FIG. 9. For the separator 30, an anion exchange membrane (brand name: Selemion, manufactured by ASAHI GLASS CO., LTD.) was used. The $IrO_2$/Ti mesh of the anode 11 was brought in close contact with the anion exchange membrane. A thickness of the cathode solution flow path 21 was set to 1 mm, and the number of lands was set to one. The number of lands of each of the $CO_2$ gas flow path 23 and the anode solution flow path 21 was set to five, and a stack was made so that a longitudinal direction of the land of the cathode solution flow path 21 and a longitudinal direction of the lands of the $CO_2$ gas flow path 23 and the anode solution flow path 12 were orthogonal to each other. A flow path area C except an area of the land of the cathode solution flow path 21 was 3 $cm^2$. Note that an evaluation temperature was set to room temperature.

Figure 12:
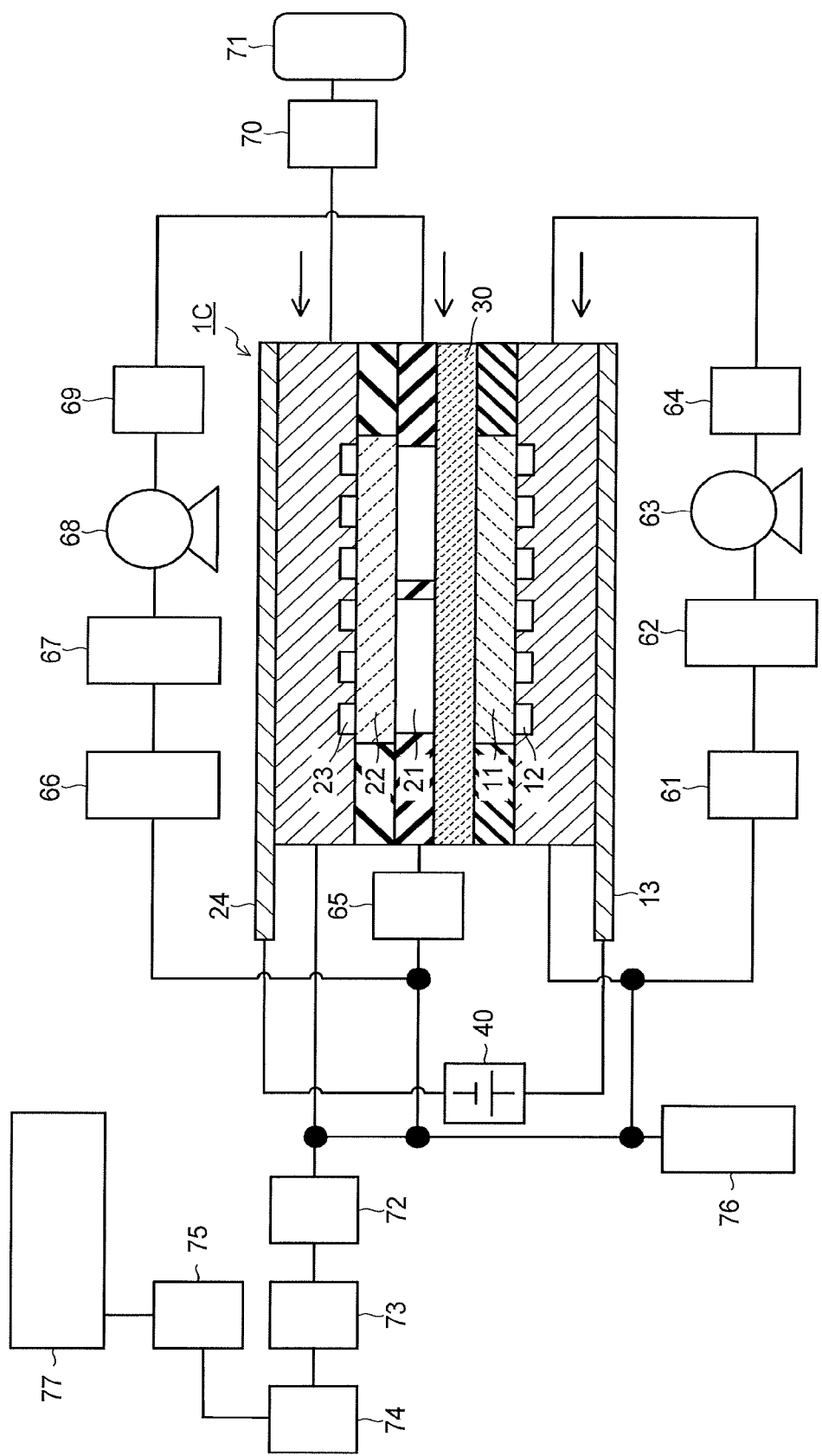
FIG. 12 is a view illustrating a configuration of a carbon dioxide electrolytic device of an example.

The electrolytic device illustrated in FIG. 12 was operated under the following condition. $CO_2$ gas was supplied to the $CO_2$ gas flow path at 20 sccm, an aqueous potassium hydroxide solution (concentration 1 M or 4 M KOH) was made to flow through the cathode solution flow path at a flow rate of 5 mL/min, and the aqueous potassium hydroxide solution (concentration 1 M or 4 M KOH) was made to flow through the anode solution flow path at a flow rate of 20 mL/min. Next, a 400 mA constant current (constant current density 100 $mA/cm^2$) was passed between the anode and the cathode using a source meter (Keithley 2400, manufactured by Tektronix Company) as a power supply, an electrolytic reaction of $CO_2$ was performed, and a cell voltage at that time was collected. Further, part of gas outputted from the $CO_2$ gas flow path was collected, and a production amount of CO or $H_2$ gas produced by a $CO_2$ reduction reaction or a reduction reaction of water was analyzed by a gas chromatograph. From the gas production amount, a partial current density and Faradaic efficiency which is a ratio between the entire current density and the partial current density of CO or $H_2$ were calculated. Further, energy efficiency $E_{es}$ of synthesis gas in which CO and $H_2$ were put together was calculated using the following expression.

$$E_{es} = \frac{1.33 \times \varepsilon_{CO,faradaic}}{V_{CELL}} + \frac{1.23 \times \varepsilon_{H2,faradaic}}{V_{CELL}} \quad \text{[Mathematical expression 1]}$$

Here, $V_{CELL}$ is a cell voltage [V], $\varepsilon_{CO}$ is CO Faradaic efficiency [%], and $\varepsilon_{H2}$ is $H_2$ Faradaic efficiency [%].

Figure 13:
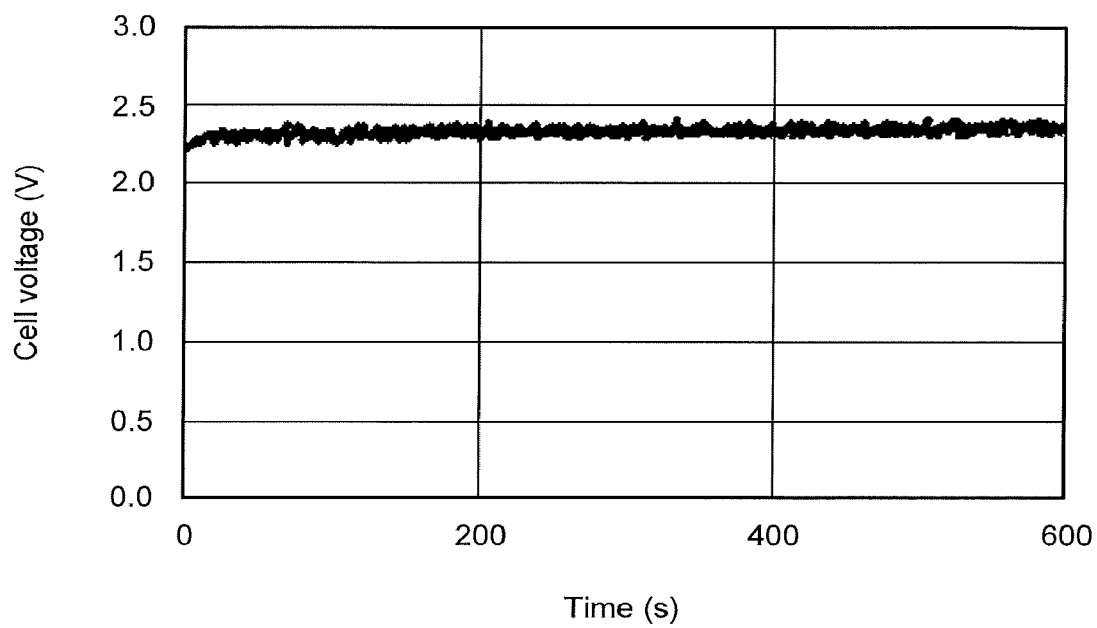
FIG. 13 is a chart illustrating a time change in a cell voltage by using the carbon dioxide electrolytic device of the example.

FIG. 13 and Table 1 present results of examining a time change in a cell voltage using 1 M KOH for an anode solution and a cathode solution. A good characteristic in which a variation in the cell voltage was small, an average value of the cell voltage was 2.34 V, and energy efficiency was 49% was obtain for 600 minutes.

TABLE 1

| Anode, Cathode Solution | 1M KOH |
|---|---|
| Constant Current [mA] | 400 |
| Electrode Area [$cm^2$] | 4 |
| Constant Current Density [$mA/cm^2$] | 100 |
| Cell Voltage [V]* | 2.34 |
| CO Faradaic Efficiency [%]* | 73 |
| $H_2$ Faradaic Efficiency [%]* | 14 |
| Energy Efficiency [%] | 49 |

*Average Value of 300 s to 570 s

Figure 14:
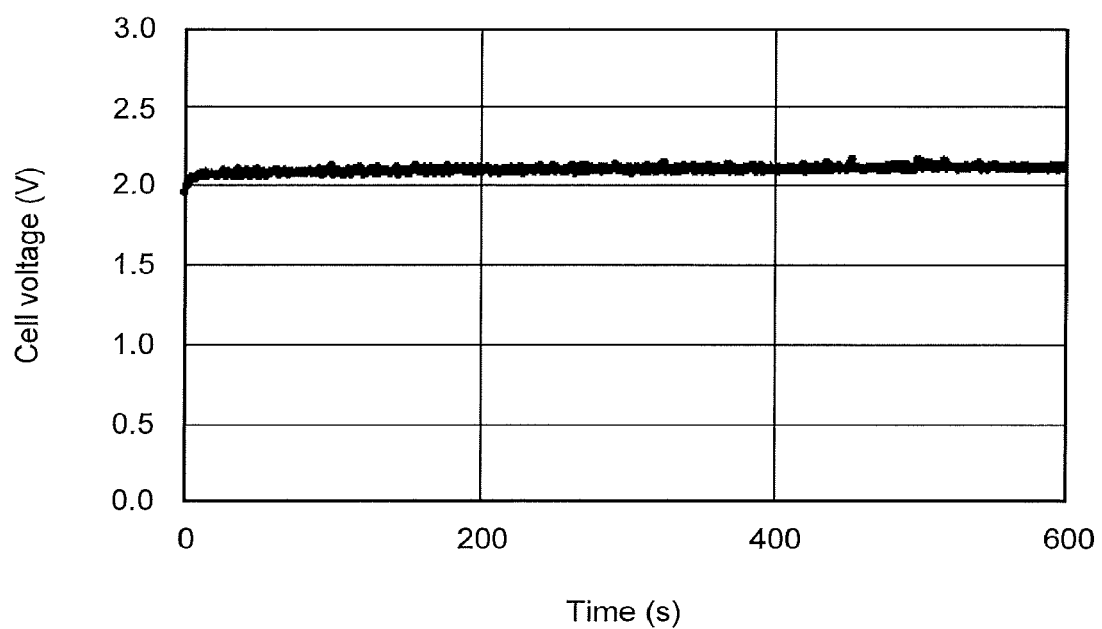
FIG. 14 is a chart illustrating a time change in a cell voltage by using the carbon dioxide electrolytic device of the example.

Moreover, in order to reduce cell resistance, a time change in a cell voltage using 4 M KOH for the anode solution and the cathode solution was examined. FIG. 14 and Table 2 present the results. A further good characteristic in which the variation in the cell voltage was small, the average value of the cell voltage was 2.13 V, and the energy efficiency was 60% was obtain as presented in FIG. 14 and Table 2.

TABLE 2

| Anode, Cathode Solution | 4M KOH |
|---|---|
| Constant Current [mA] | 400 |
| Electrode Area [$cm^2$] | 4 |
| Constant Current Density [$mA/cm^2$] | 100 |
| Cell Voltage [V]* | 2.13 |
| CO Faradaic Efficiency [%]* | 91 |
| $H_2$ Faradaic Efficiency [%]* | 5.1 |
| Energy Efficiency [%] | 60 |

*Average Value of 300 s to 570 s

Note that configurations of the above-described embodiments may be each applied in combination, and further may be partially substituted. Herein, while certain embodiments of the invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. An electrolysis cell for carbon dioxide comprising:
an anode part including an anode to oxidize water or hydroxide ions and thus produce oxygen and an anode solution flow path to supply an anode solution to the anode;
a cathode part including a cathode to reduce carbon dioxide and thus produce a carbon compound, a cathode solution flow path to supply a cathode solution to the cathode, and a gas flow path to supply carbon dioxide to the cathode; and
a separator to separate the anode part and the cathode part,
wherein the anode has a first surface in contact with the separator, and a second surface facing the anode solution flow path so that the anode solution is in contact with the anode,
the cathode has a first surface facing the cathode solution flow path and a second surface facing the gas flow path, and the cathode solution flow path is disposed between the separator and the cathode so that the cathode solution is in contact with the separator and the cathode, and
the anode solution flow path has a plurality of first lands, the cathode solution flow path has a second land, the gas flow path has a plurality of third lands, and each of a ratio of a number of the first lands to a number of the second land and a ratio of a number of the third lands to the number of the second land is two or more and 10 or less.

2. The cell according to claim 1,
wherein the anode includes a base material having at least one selected from the group consisting of a mesh material, a punching material, a porous body, and a metal fiber sintered body, and
wherein the anode has the base material including an anode catalyst or a catalyst layer including an anode catalyst provided on the base material.

3. The cell according to claim 2, wherein the base material includes a metal material containing at least one selected from the group consisting of Ti, Ni, and Fe, and the anode catalyst includes a metal material containing at least one metal selected from the group consisting of Ni, Fe, Co, Mn, La, Ru, Li, Ir, In, Sn, and Ti, or an oxide material containing the metal.

4. The cell according to claim 1, wherein the cathode has a cathode catalyst containing at least one metal selected from the group consisting of Au, Ag, Cu, Pt, Pd, Ni, Co, Fe, Mn, Ti, Cd, Zn, In, Ga, Pb, and Sn, and the cathode catalyst has at least one selected from the group consisting of nanoparticles of the metal, a nanostructure of the metal, nanowires of the metal, and a composite body in which the nanoparticles are supported by carbon particles, carbon nanotubes, or graphene particles.

5. The cell according to claim 1, wherein the anode solution and the cathode solution contain at least one ion selected from the group consisting of a hydroxide ion, a hydrogen ion, a potassium ion, a sodium ion, a lithium ion, a cesium ion, a chloride ion, a bromide ion, an iodide ion, a nitrate ion, a sulfate ion, a phosphate ion, a borate ion, and a hydrogen carbon ion.

6. The cell according to claim 1, wherein the anode solution and the cathode solution are an alkaline solution, and the separator is an anion exchange membrane.

7. The cell according to claim 1, wherein the carbon compound to be produced by a reduction reaction of the carbon dioxide contains at least one selected from the group consisting of carbon monoxide, methane, ethane, ethylene, methanol, ethanol, and ethylene glycol.

8. The cell according to claim 1, wherein a flow path area A of the anode solution flow path and a flow path area B of the gas flow path are substantially same as a flow path area C of the cathode solution flow path, and an area D of the anode and the cathode is larger than the flow path area C.

9. The cell according to claim 1, wherein an area D of the anode and the cathode is larger than a flow path area C of the cathode solution flow path.

10. The cell according to claim 1, wherein the second land is disposed so that a longitudinal direction of the second land is orthogonal to a longitudinal direction of the first and third lands.

11. The cell according to claim 1,
wherein the cathode part further includes a cathode current collector, and the anode part further includes an anode current collector, and
wherein the cathode current collector is disposed between the cathode solution flow path and the cathode.

12. The cell according to claim 1, wherein each of the ratio of the number of the first lands to the number of the second land and the ratio of the number of the third lands to the number of the second land is 3 or more and 10 or less.

13. The cell according to claim 1, wherein the cathode includes a gas diffusion layer disposed on the gas flow path side, and a cathode catalyst layer disposed on the cathode solution flow path side.

14. The cell according to claim 13, wherein the cathode further includes a porous layer provided between the gas diffusion layer and the cathode catalyst layer, and the porous layer is denser than the gas diffusion layer.

15. The cell according to claim 1, wherein the cathode solution flow path is provided in a flow path plate, and the second land has only one land portion provided in a central vicinity of the cathode solution flow path and two bridge portions which is thinner than the land portion and is provided to retain to the land portion with the flow path plate.

16. An electrolytic device for carbon dioxide comprising:
an electrolysis cell according to claim 1; and
a power supply to pass an electric current between the anode and the cathode of the electrolysis cell.

* * * * *